UNITED STATES PATENT OFFICE.

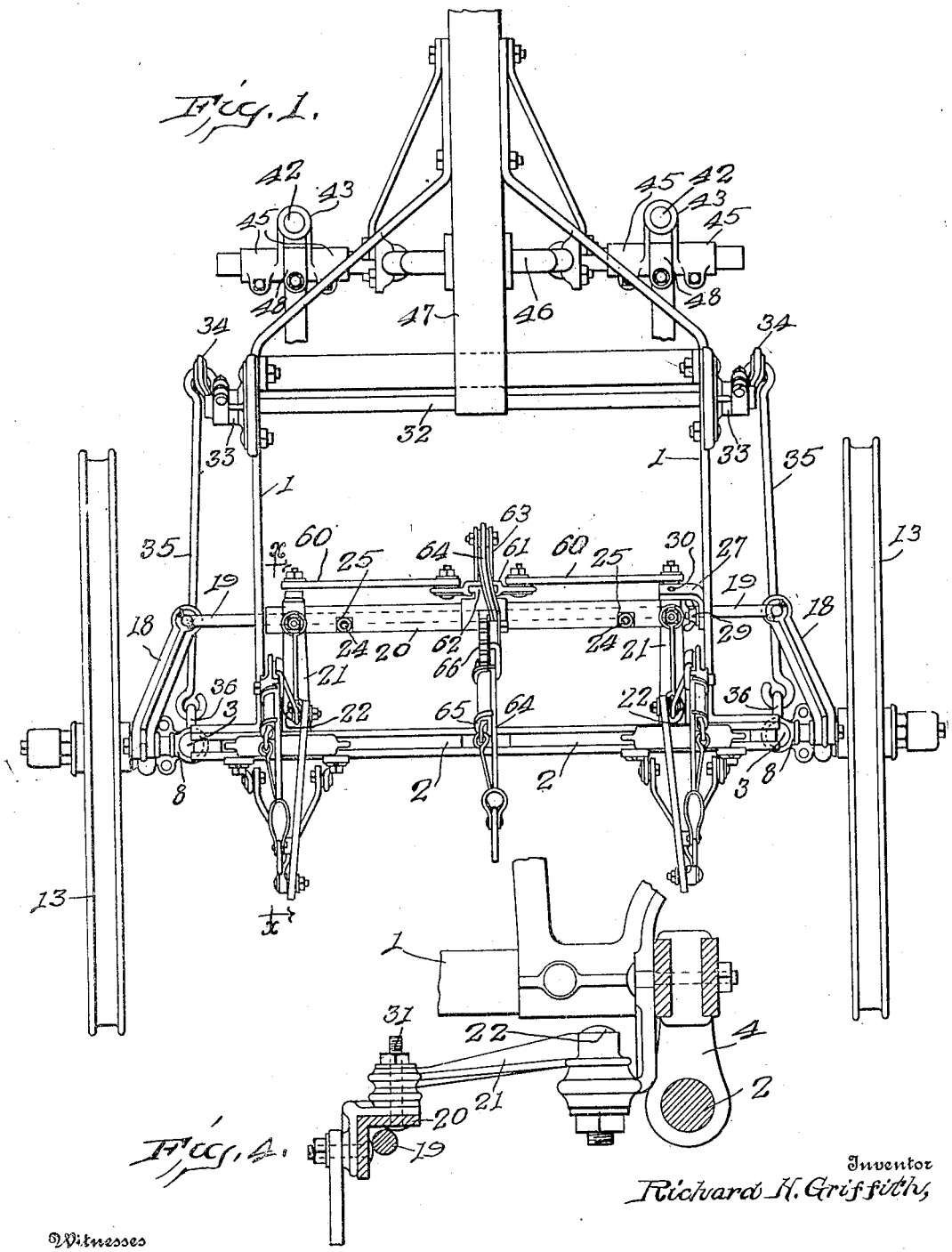

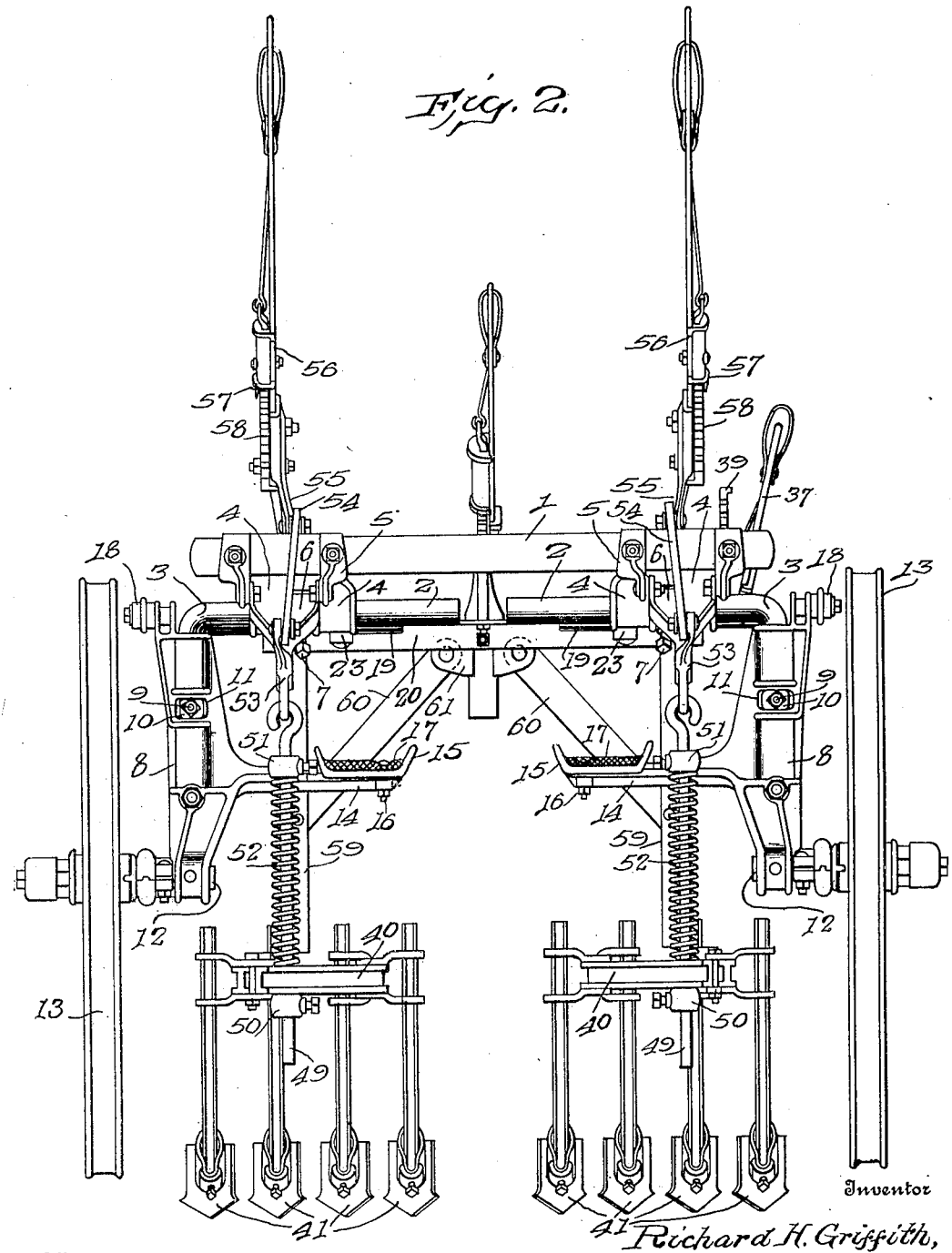

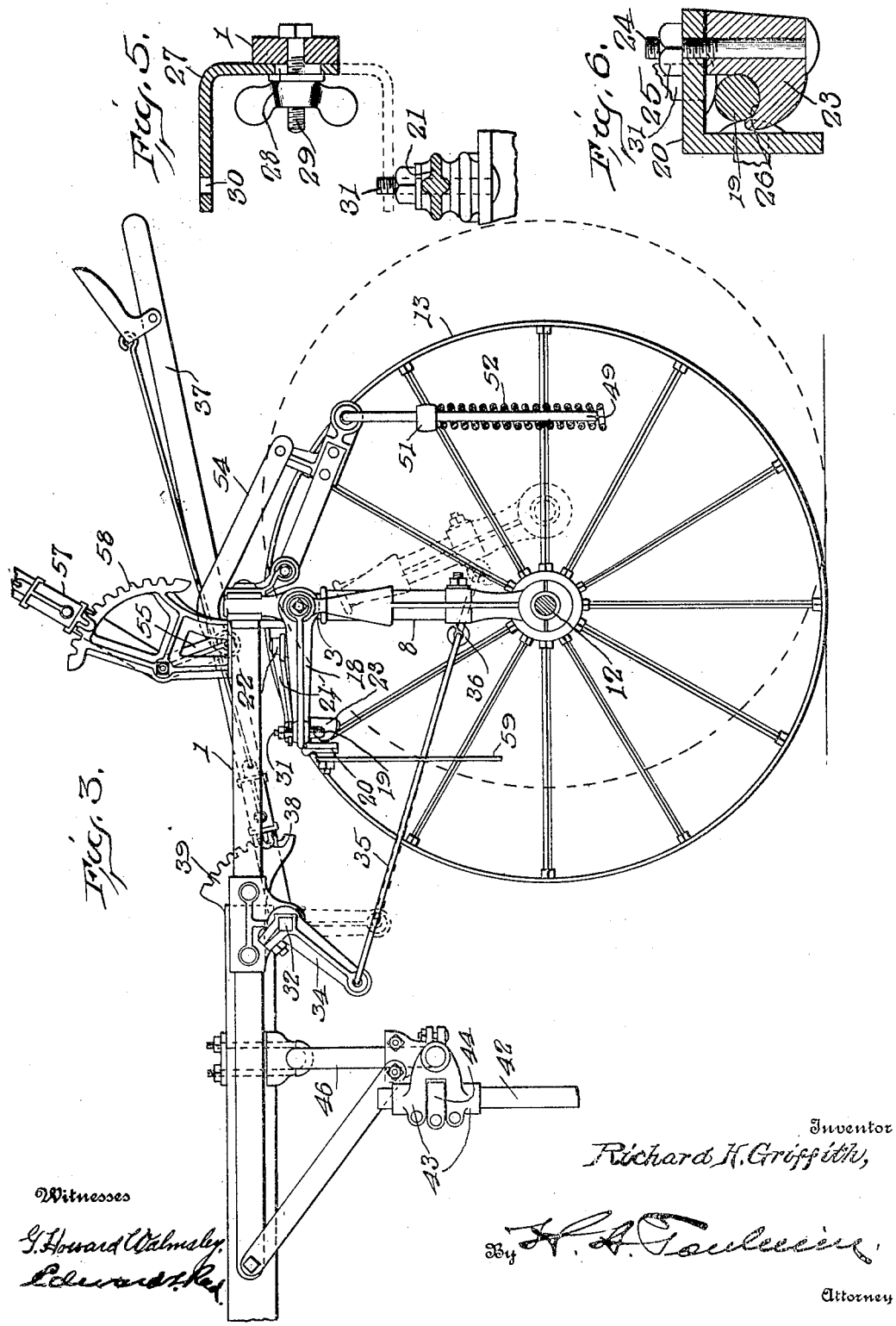

RICHARD H. GRIFFITH, OF BELLEVUE, OHIO, ASSIGNOR TO THE OHIO CULTIVATOR COMPANY, OF BELLEVUE, OHIO, A CORPORATION OF OHIO.

CULTIVATOR.

No. 927,788.      Specification of Letters Patent.      Patented July 13, 1909.

Application filed October 17, 1908. Serial No. 458,170.

*To all whom it may concern:*

Be it known that I, RICHARD H. GRIFFITH, a citizen of the United States, residing at Bellevue, in the county of Huron and State of Ohio, have invented certain new and useful Improvements in Cultivators, of which the following is a specification, reference being had therein to the accompanying drawings.

This invention relates to cultivators, and more particularly to that type of cultivator in which the main frame is pivotally mounted on the horizontal portion of a cranked axle and the ground wheels are pivotally connected to the vertical portions of said cranked axle, whereby said axle can be moved about its pivotal connection to said main frame and thus raise and lower the main frame and the parts carried thereby.

The object of the invention is to provide a cultivator of this character in which the several parts will be so arranged and so connected one to the other that, when the axle is moved about its pivotal connection to the main frame, the parts will neither bind nor be subjected to undue strain; to provide such a cultivator in which the ground wheels can be adjusted laterally; to provide extensible foot levers for actuating the ground wheels about their pivotal connection to the axle; to provide means for locking the ground wheels against movement about their vertical axes; and to improve the construction and arrangement of the several parts of the machine, whereby a more efficient operation is secured.

With these objects in view my invention consists in certain novel features and in certain combinations and arrangements of parts hereinafter to be described, and then more particularly pointed out in the claims.

In the accompanying drawings, Figure 1 is a top plan view of a cultivator embodying my invention; Fig. 2 is a rear elevation of the same; Fig. 3 is a side elevation thereof; Fig. 4 is a sectional view, taken on the line $x\ x$ of Fig. 1 and looking in the direction of the arrows; Fig. 5 is a detail, sectional view of the locking device; and Fig. 6 is a sectional view, taken transversely to the connecting bar.

In these drawings I have illustrated the preferred form of my invention and have shown the same as comprising a main frame 1 pivotally connected to the horizontal portions 2 of a two part axle 3, the two portions of which are so arranged as to form a single cranked axle. The main frame is preferably connected to each of the portions 2 by means of double bearings 4 carried by brackets 5 which are rigidly secured to the main frame. A collar 6 is mounted on each part 2, of the axle between the two parts of the bearing 4 and is adapted to be secured in its adjusted position by means of a set screw 7, thus permitting each part of the axle to be adjusted transversely of the main frame. By means of a construction hereinafter described the two parts of the axle are, normally, rigidly connected one to the other and a single cranked axle is formed which is adjustable transversely to the direction of movement of the cultivator, but which, in all other respects, operates as an integral axle. Suitable bearings are mounted on the vertical portions of the axle 3 and are provided with spindles adapted to carry ground wheels. In the present instance each of these bearings comprises a bracket or casting 8 having a recess or bearing in the upper portion thereof adapted to receive the lower end of one of the vertical portions of the axle. This bearing or casting 8 is secured in position upon the vertical portion of the axle by means of a bolt 9 extending through the axle and having a washer 10 fitting within a transverse slot 11 formed in the casting, the length of the slot being greater than the length of the washer, thus allowing the casting a certain limited movement in either direction about its vertical axis. A spindle 12 is rigidly secured to the lower end of the casting 8 and is adapted to support one of the ground wheels 13. Each of the castings 8 is also provided with an inwardly extending arm 14 having its inner end located within convenient reach of the foot of the driver and provided with a foot piece 15 which is reversibly mounted on the end of the arm by means of a bolt 16 extending through the arm and through an aperture 17 formed near one end of the foot piece 15, thus enabling the arm or foot lever 14 to be extended, when the ground wheels have been adjusted laterally of the main frame and are in their outermost position, by reversing the position of the arm or lever 14. Suitable means are also provided for so connecting the ground wheels one to the other that they will move in unison and the forward movement of one of the foot levers will move both of the ground wheels about their vertical axes in one direction, while the forward movement of the other foot lever will move both ground wheels in the opposite direction. This connection preferably consists of a transverse rod or bar having its ends pivotally connected to forwardly extending arms 18 mounted upon the bearing casting 8 on each of the vertical portions of the axle. These arms 18 are each pivotally conected to the supporting casting 8 and have their axes arranged in a substantially horizontal plane and in substantial alinement with the axis of the horizontal portion of the axle 3. In the present instance I have shown the bar connecting the two arms 18 as extensible and comprising two end portions 19 each pivotally connected at its outer end to the adjacent arm 18 and having its inner end adjustably secured to a connecting member or bar 20, which, in the present instance, comprises an angle bar pivotally supported on the outer ends of arms 21, each of which is mounted on a vertical pivot 22 carried by the main frame.

The rods 19 may be adjustably secured to the angle bar 20 in any suitable manner and I have here shown this bar as provided near each end with a block 23 having a screw-threaded member or bolt 24 extending through the horizontal portion of the angle bar 20 and provided on its outer end with a nut 25. That portion of the block 23 lying in the angle of the bar 20 is cut away or grooved, as shown at 26, and is adapted to receive the adjacent rod 19. The diameter of the groove 26 relative to the diameter of the rod is such that, when the nut 25 is tightened down on the bolt 24 to draw the block 23 toward the under surface of the angle bar, the rod 19 will be clamped firmly in the corner of the angle bar, but, by loosening the nut 25, the rod 19 can be readily adjusted longitudinally of the connecting member or angle bar 20. Suitable means may also be provided for locking this connecting rod against movement, thereby locking the ground wheels 13 against movement about their vertical axes. In the present instance I have shown this locking means as comprising an angular clip 27 having one arm slotted, as shown at 28, and adapted to be secured by means of a bolt 29 to one of the side members of the main frame and having its other or horizontal arm provided with an aperture 30 adapted to receive the upper end of the bolt 31 by means of which the adjacent arm 21 is secured to the connecting member or angle bar 20, the upper end of this bolt extending some distance above its nut. Thus, it will be seen that by loosening the bolt 29, which is preferably provided with a thumb nut, the clip 27 may be moved into a vertical position and then moved downwardly to bring the apertured arm of the clip into engagement with the upper end of the bolt 31. Then by tightening down the bolt the clip will be locked in its position and the connecting rod will be locked against movement.

The axle 3 may be moved about its pivotal connection to the main frame 1 in any suitable manner, but I prefer the mechanism herein shown for that purpose and which consists of a shaft 32 journaled in bearings 33 secured to the main frame near the forward end thereof and provided with depending arms 34 which extend downwardly and forwardly and are preferably secured to the outer ends of the shaft 32, which outer ends lie beyond the side members of the main frame. These arms 34 are connected by means of rods 35 to the casting 8 on the corresponding side of the machine, which casting is provided with an eye-bolt 36 on which the corresponding end of the link or rod 35 is pivotally secured. A lever 37 is rigidly secured to one end of the shaft 32 and extends rearwardly to within reach of the driver. This lever is provided with the usual spring-pressed detent 38 adapted to engage a toothed segment 39 for locking the lever and the parts which it operates against movement. Thus, it will be seen that the two parts of the axle are rigidly connected one to the other and by actuating the lever 37 to move the shaft 32 in a forward direction about its longitudinal axis, the bearing castings 8, and, consequently, the cranked axle to which they are secured, will be moved about a transverse axis carrying the ground wheels rearwardly relatively to the main frame, thereby lowering the main frame. When the lever is moved in the opposite direction the ground wheels will be moved forwardly relatively to the main frame and this frame raised to its normal or elevated position. It will be noticed that in this operation the several arms which support the connecting rod for the ground wheels are mounted on different parts of the machine, the arms 18 being mounted on the bearing castings on the axle and the arms 21 being mounted on the main frame. These arms are all connected at their forward ends to the connecting rod and these ends have no movement relatively one to the other in the normal operation of the machine. Consequently, if these arms or the parts by which they are carried move about different axes there would be a tendency to move the inner ends of the arms relatively one to the other and a severe strain would be placed upon the arms and the connecting rod, interfering with the action of the machine and probably resulting in breakage. To overcome this difficulty I have arranged the axes of the arms 18 in substantial aline-
ment with the axis of the horizontal portion
of the cranked axle, which axis is also the
axes of the arms 21. Consequently, there
is no tendency to move the inner ends of the
arms and no strain is placed upon the sev-
eral parts.

The cultivating members comprise beams
40 each provided with a series of hoes or
shovels 41. Each of these beams is provided
at its forward end with a vertically arranged
part 42 journaled in a double bearing 43 and
held against vertical movement therein by
means of a collar 44 secured to the member
42 between the two parts of said bearing.
The bearings 43 are in the form of forwardly
extending brackets carried by double bear-
ings 45 which are journaled on the hori-
zontal end portions of a yoke 46 carried by
a tongue 47 secured to the forward portion
of the main frame 1. The bearings 45 are
held against longitudinal movement on the
yoke 46 by means of collars 48 mounted on
said yoke between the two parts of the bear-
ings 45. The beams 40 extend rearwardly
from the vertical portions 42 to points be-
yond the rear end of the frame 1 and are
there provided with suitable means for rais-
ing and lowering the same. In the present
instance I have shown each of the beams 40
as provided with a rod 49 extending through
a part carried by the beam and having a
collar 50 secured thereto beneath said beam
to limit the vertical movement of said rod
relatively to said beam. A second collar 51
is secured to the rod 49 at a point some dis-
tance above the beam and a spring 52 is
coiled about the rod between the collar 51
and the part carried by the beam. The up-
per end of each rod 49 is pivotally connected
to an arm 53 which is pivotally supported
from the main frame 1 and is connected by
means of a link 54 with an arm 55 which is
rigidly secured to a lever 56 pivotally mount-
ed on the main frame 1 and extends on the
side of the pivotal center opposite that por-
tion of the lever 56 carrying the handle.
This lever is provided with the usual spring-
pressed pawl 57 adapted to engage a seg-
mental rack 58 mounted on the main frame.
Thus, it will be seen that by moving the up-
per or handle portion of the lever 56 down-
wardly the rod 49 and the beam connected
thereto will be elevated and that by moving
the lever 56 upwardly and forwardly the
beam will be lowered, and as the forward
movement of the lever continues the rod 49
will be forced downwardly and the spring
52 placed under tension, thus tending to
force the shovels 41 into the ground. By
moving the levers 56 to their extreme for-
ward position the entire weight of the ma-
chine will be thrown upon the beams and the
shovels, and the ground wheels lifted out of
engagement with the ground.

The beams 40 are provided with a suitable
spreading device comprising upwardly ex-
tending arms or bars 59 pivotally connected
at their lower ends to the beams and pivot-
ally connected at their upper ends to the bar
20 supported from the main frame 1. Links
60 are pivotally connected at one end to the
arms 59 and extend upwardly and inwardly
and have their upper ends pivotally con-
nected to a sliding bracket or block 61 which
is mounted on a T-shaped guide block 62
supported from the angle bar 20 forming a
part of the connecting rod between the two
ground wheels. The slide block 61 is con-
nected by means of a link 63 with the lower
end of a lever 64 which is pivotally mounted
on the angle bar 20 and is provided with the
usual spring-pressed pawl 65 adapted to en-
gage a segmental rack 66. Thus, by actuat-
ing the lever 64 and the slide block 61, the
beams will be simultaneously moved in-
wardly or outwardly.

The operation of the device will be readily
understood from the foregoing description
and it will be apparent that I have provided
a cultivator of this character in which the
movement of the main frame relatively to
the ground wheel will be effected without
imposing any undue strain on the several
parts thereof or causing any of these parts
to bind in their operation. It will further
be apparent that I have provided a machine
of this character in which the ground wheels
can be adjusted laterally to the main frame
and which are so connected one to the other
as to move in unison; that I have provided
means for locking these wheels against move-
ment when so desired; that I have provided
extensible foot levers whereby the foot pieces
of said levers are within convenient reach of
the driver in any lateral position of the
ground wheels; and further, that I have so
constructed and arranged the several parts
of the machine as to form a compact, easily
operated cultivator having a high degree of
efficiency.

I wish it to be understood that I do not
desire to be limited to the details of construc-
tion shown and described, for obvious modi-
fications will occur to a person skilled in the
art. For instance, the character of the con-
nection formed between the ground wheels
and the axle 3, consisting, in the present in-
stance, of the bracket or casting 8, may be
greatly altered without departing from the
spirit of the invention, the essential charac-
teristic of this connection being that it per-
mits the ground wheels to be moved about a
vertical axis or an axis arranged at substan-
tially right angles to the horizontally piv-
oted axle 3.

Having thus fully described my invention,
what I claim as new and desire to secure by
Letters Patent is:—

1. In a cultivator, the combination, with a main frame, a cranked axle having its horizontal portion connected to said main frame, brackets pivotally mounted on the vertical portion of said axle, and ground wheels connected to said brackets, of means for connecting said brackets one to the other, said means being pivotally connected at its opposite ends to said brackets, the axes of said pivotal connections being in substantial alinement with the axis of the horizontal portion of the axle.

2. In a cultivator, the combination, with a main frame, a cranked axle having its horizontal portion pivotally connected to said main frame, brackets pivotally mounted on the vertical portions of said axle, and ground wheels connected to said brackets, of means for connecting said brackets one to the other comprising a part supported from said main frame and a part supported from each of said brackets and connected to the part carried by said main frame.

3. In a cultivator, the combination, with a main frame, a cranked axle having its horizontal portion pivotally connected to said main frame, brackets pivotally mounted on the vertical portions of said axle, and ground wheels connected to said brackets, of a forwardly extending arm pivotally connected to each of said brackets and having its axis in substantial alinement with the axis of the horizontal portion of said axle, and an adjustable rod connecting the forward ends of said arms.

4. In a cultivator, the combination, with a main frame, a cranked axle having its horizontal portion pivotally connected to said main frame, brackets pivotally mounted on the vertical portions of said axle, and ground wheels connected to said brackets, of an arm pivotally connected to each of said brackets and having its axis in substantial alinement with the axis of the horizontal portion of said axle, rods each connected at one end to one of said arms, a connecting member supported from said main frame, and means for adjustably connecting each of said rods to said connecting member.

5. In a cultivator, the combination, with a main frame, a cranked axle having its horizontal portion pivotally connected to said main frame, brackets pivotally mounted on the vertical portions of said axle, and ground wheels connected to said brackets, of an arm pivotally connected to each of said brackets, two rods each having one end connected to one of said arms, a connecting member movably supported from said main frame, and means for adjustably connecting said rods to said connecting member.

6. In a cultivator, the combination, with a main frame, a cranked axle having its horizontal portion pivotally connected to said main frame, brackets pivotally mounted on the vertical portions of said axle, and ground wheels connected to said brackets, of an arm pivotally connected to each of said brackets, rods each having one end connected to one of said arms, an angle bar supported from said main frame, and a locking member carried by said angle bar and adapted to secure said rods thereto.

7. In a cultivator, the combination, with a main frame, a cranked axle having its horizontal portion pivotally connected to said main frame, brackets pivotally mounted on the vertical portions of said axle, and ground wheels connected to said brackets, of an arm pivotally connected to each of said brackets, rods each having one end pivotally connected to one of said arms, arms pivotally connected to said main frame and extending substantially parallel with the first-mentioned arms, an angle bar carried by the outer ends of the last-mentioned arms, a clamping block carried by said angle bar near each end thereof and adapted to engage the free end of the adjacent rod and clamp the same to said angle bar.

8. In a cultivator, the combination, with a main frame, a cranked axle having its horizontal portion pivotally connected to said main frame, brackets pivotally mounted on the vertical portions of said axle, and ground wheels connected to said brackets, of means for connecting said wheels one to the other to cause the same to move about their vertical axes in unison, and an extensible foot lever carried by each of said brackets.

9. In a cultivator, the combination, with a main frame, a cranked axle having its horizontal portion pivotally connected to said main frame, brackets pivotally mounted on the vertical portions of said axle, and ground wheels connected to said brackets, of means for connecting said wheels one to the other to cause the same to move about their vertical axes in unison, an arm extending inwardly from each of said brackets, and a foot piece reversibly connected at one end to the inner end of each of said arms.

10. In a cultivator, the combination, with a main frame, a cranked axle having its horizontal portion pivotally connected to said main frame, brackets pivotally mounted on the vertical portions of said axle, and ground wheels connected to said brackets, of means for connecting said wheels one to the other to cause the same to move about their vertical axes in unison, an arm extending inwardly from each of said brackets, a foot piece having an aperture near one end thereof, and a bolt adapted to extend through said aperture and through said arm.

11. In a cultivator, the combination, with a main frame, a cranked axle having its horizontal portion pivotally connected to said main frame, brackets pivotally mounted on the vertical portions of said axle, and ground wheels connected to said brackets, of a connecting rod connected at its opposite ends with each of said brackets, an arm supported from said main frame and pivotally connected to a part of said rod and having an upwardly extending portion, a clip movably mounted on the main frame and having an aperture in one part thereof adapted to receive the upwardly extending part of said arm.

12. In a cultivator, the combination, with a main frame, a cranked axle having its horizontal portion pivotally connected to said main frame, brackets pivotally mounted on the vertical portions of said axle, and ground wheels connected to said brackets, of a forwardly extending arm connected to each of said brackets, rods each connected at one end to one of said arms, other arms supported from the main frame, a connecting bar, bolts for connecting said last-mentioned arms to said connecting bar, one of said bolts extending above said arm, an angle clip having a slot in one arm thereof, a bolt extending through said slot for connecting said clip to the main frame, the other arm of said clip having an aperture and being adapted to engage said upwardly extending bolt.

13. In a cultivator, the combination, with a main frame, a two part cranked axle, the horizontal portion of each part of said axle being pivotally supported from said main frame, a bracket journaled on the vertical portion of each part of said axle, and ground wheels connected to said bracket, of an adjustable connecting bar extending between said brackets.

14. In a cultivator of the character described, a main frame, bearings carried by said main frame, a two part cranked axle, each part of said axle having its horizontal member mounted in one of said bearings, adjustable means for locking each part of said axle against longitudinal movement in said bearing, a bracket pivotally mounted on the vertical portion of each part of said axle, a ground wheel connected to each of said brackets, a forwardly extending arm pivotally connected to each of said brackets, and an adjustable connecting member secured at its opposite ends to each of said arms.

15. In a cultivator of the character described, a main frame, bearings carried by said main frame, a two part cranked axle, each part of said axle having its horizontal member mounted in one of said bearings, adjustable means for locking each part of said axle against longitudinal movement in said bearing, a bracket pivotally mounted on the vertical portion of each part of said axle, a ground wheel connected to each of said brackets a forwardly extending arm pivotally connected to each of said brackets having its axis in substantial alinement with the axes of the horizontal portions of the two parts of said axle, rods each connected at one end to one of said arms, a connecting bar supported from said main frame, and means for adjustably connecting said rod to said connecting bar.

16. In a cultivator of the character described, the combination, with a main frame, an axle supported therefrom and movable about a longitudinal axis, a bracket secured to each end of said axle and movable about a vertical axis, and ground wheels carried by said brackets, of an arm pivotally connected to each of said brackets and having its axis in substantial alinement with the axis of said axle, and a rod connecting the ends of said arms.

17. In a cultivator of the character described, the combination, with a main frame, a two part longitudinally adjustable axle supported from said main frame, a bracket secured to each end of said axle and movable about a vertical axis, and ground wheels carried by said brackets, of an arm pivotally connected to each of said brackets, said arms having their axes in substantial alinement with the axis of said axle, and a rod connecting the ends of said arms.

18. In a cultivator of the character described, the combination, with a main frame, a cranked axle pivotally connected thereto, a spindle supported from each end of said axle and movable about a vertical axis, and ground wheels carried by said spindles, of an arm connected with each of said spindles and movable about a horizontal axis, said horizontal axis being arranged in substantial alinement with the axis of said axle, and a rod connecting the ends of said arms.

19. In a cultivator of the character described, the combination, with a main frame, a two part longitudinally adjustable axle supported from said main frame, a spindle supported from each end of said axle and movable about a vertical axis, and ground wheels carried by said spindles, of an arm connected with each of said spindles and movable about a horizontal axis, said horizontal axis being arranged in substantial alinement with the axis of said axle, and a rod connecting the ends of said arms.

20. In a cultivator, the combination, with a main frame, a cranked axle having its horizontal portion pivotally connected to said main frame, brackets pivotally mounted on the vertical portions of said axle, and ground wheels connected to said brackets, of an arm pivotally connected to each of said brackets, each arm having its axis in substantial alinement with the axis of the horizontal portion of said axle, and means for connecting said arms one to the other.

21. In a cultivator, the combination, with a main frame, a cranked axle having its horizontal portion pivotally connected to said main frame, ground wheels, spindles for said ground wheels, and means for connecting said spindles to said axle, of a forwardly extending arm pivotally mounted on each of said connecting means and having its axis in substantial alinement with the axis of the horizontal portion of said axle, and a rod connecting the forward ends of said arms one to the other.

22. In a cultivator, the combination, with a main frame, ground wheels, spindles for said ground wheels, means for connecting said spindles to said main frame, whereby said ground wheels may be moved about a vertical axis to steer the cultivator and may be moved about a horizontal axis, arms pivotally mounted on each of said connecting means and having their axes arranged in substantial alinement with the horizontal axis of said connecting means, and a rod connecting said arms one to the other.

23. In a cultivator, the combination, with a main frame, a cranked axle having its horizontal portion pivotally connected to said main frame, and ground wheels pivotally connected to the vertical portions of said axle, of connecting means for said ground wheels pivotally connected to the respective pivotal connections between the ground wheels and said axle, the axes of the pivotal connections for said connecting means being in substantial alinement with the axis of the horizontal portion of said axle.

In testimony whereof, I affix my signature in presence of two witnesses.

RICHARD H. GRIFFITH.

Witnesses:
E. H. ERDRICH,
E. A. KEMP.